United States Patent
Gassmann

[11] Patent Number: 5,881,849
[45] Date of Patent: Mar. 16, 1999

[54] VISCOUS COUPLING WITH STEPPED TORQUE CURVE

[75] Inventor: Theodor Gassmann, Siegburg, Germany

[73] Assignee: GKN Viscodrive GmbH, Lohmar, Germany

[21] Appl. No.: 861,363

[22] Filed: May 21, 1997

[51] Int. Cl.$^6$ ................................................. F16D 57/02
[52] U.S. Cl. ..................... 188/294; 192/58.41; 92/123
[58] Field of Search ................................. 188/293, 294, 188/296, 306, 307, 264 E, 268, 271; 192/58.4, 58.41, 58.42, 70.14; 92/123

[56] References Cited

U.S. PATENT DOCUMENTS

| 4,925,409 | 5/1990 | Johnson | 192/58.41 |
| 5,232,075 | 8/1993 | Mohan | 192/58.41 |

FOREIGN PATENT DOCUMENTS 2278179  11/1993  United Kingdom .

*Primary Examiner*—Lee W. Young
*Attorney, Agent, or Firm*—Howard & Howard

[57] ABSTRACT

The invention relates to a viscous coupling particularly suitable as a brake for a firebreak door. Outer plates are non-rotatably associated with a housing by means of teeth. Between each two outer plates there is arranged one of two inner plates, which are non-rotatably connected to a hub rotatably arranged in the housing by teeth. The other inner plate is connectable in the direction of rotation to the first inner plate and to each other by two sets of lugs such that there is a free rotational path. When the lugs of two successive inner plates contact one another in the direction of rotation, a driving action occurs. Consequently, torque increases in a stepwise fashion. Therefore, it is possible for firebreak doors to affect the braking of movement into a closed position because braking is delayed and changes in steps.

6 Claims, 2 Drawing Sheets

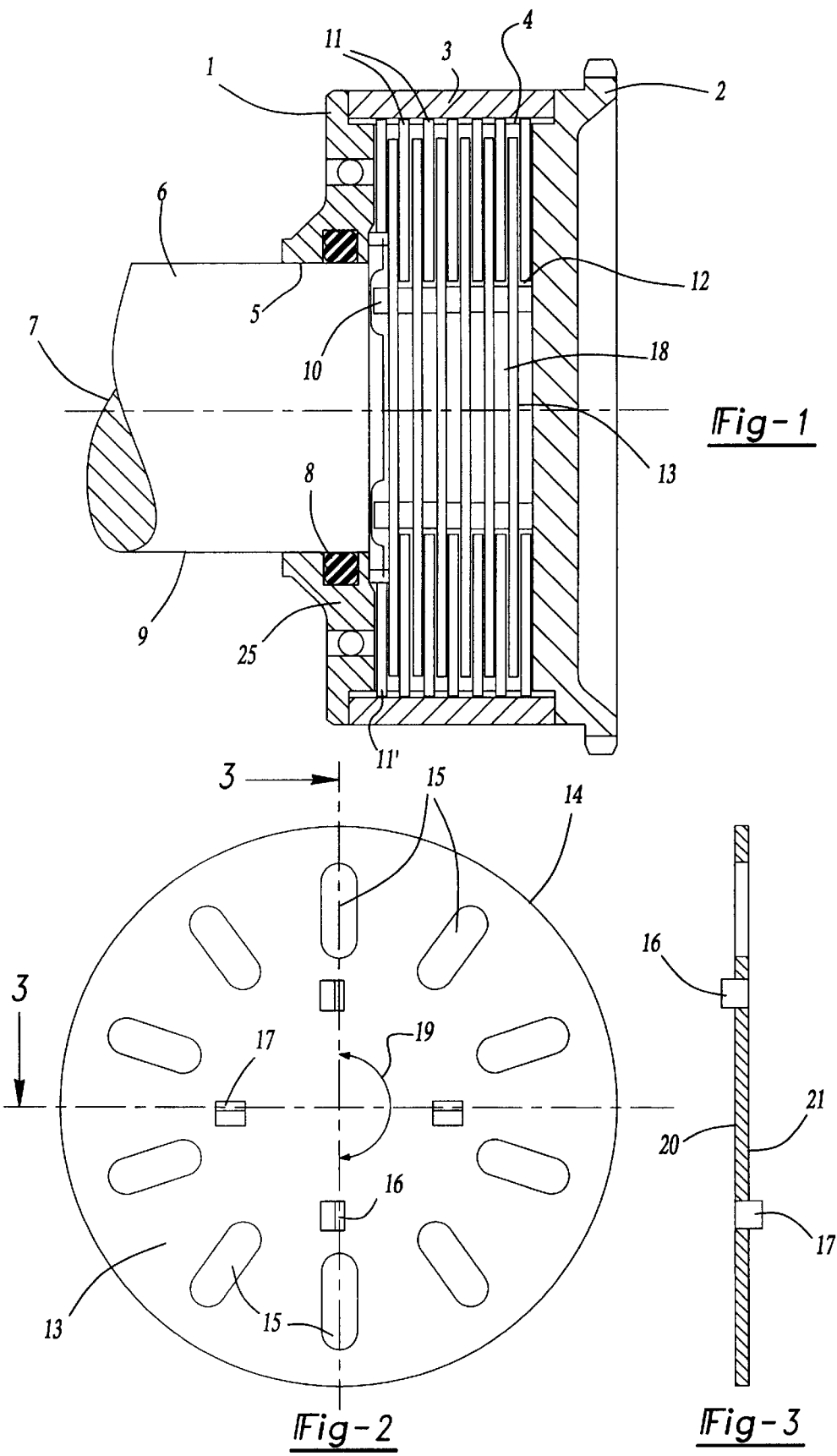

VISCOUS COUPLING WITH STEPPED TORQUE CURVE

BACKGROUND OF THE INVENTION

The invention relates to a viscous coupling for particular use as a brake and comprises a housing and a hub arranged coaxially around one another. Both are rotatable relative to one another and relative to an axis of rotation which also forms a longitudinal axis of the viscous coupling. The housing and hub enclose an inner chamber containing two sets of annular plates. One set forms outer plates, and the other set forms inner plates. The inner plates are arranged along the longitudinal axis to alternate relative to the outer plates in a certain sequence. The outer and inner plates partially overlap one another in the radial direction. The part of the inner chamber which is not occupied by plates is at least partially filled with a highly viscous medium, and preferably silicone oil.

A viscous coupling is described in U.S. Pat. No. 4,889,206. One of the two sets of plates comprises first plates which are non-rotatably connected to the associated coupling part (housing or hub). The second plates of the same set, along a predetermined rotational path, are able to carry out a relative movement relative to the coupling part and relative to the first plates of the set of plates. The relative rotation leads to an axial adjustment which changes the gap between the plates. Thus, as a function of the direction of rotation, different torque characteristics are achieved. The viscous coupling is intended for use in the driveline of the selectively driven rear wheels of a motor vehicle having a permanent drive for the front wheels.

A viscous coupling used as a brake in a driving device for vertically movable doors is described in DE 44 36 237 C1. Firebreak doors are automatically movable from a raised open position to a closed position and are provided in the form of roll-up doors. The doors must move automatically into the closed position when a fire breaks out. And, the door must move into the closed position by its own weight. This movement must also be delayed. However, with roll-up doors it is important for initial acceleration to be possible; but, the closed position be assumed under slowed-down conditions to prevent any damage to the door.

It is therefore the object of the invention to propose a viscous coupling which can also be used as a brake whose driving and braking torque curves increase in steps.

SUMMARY OF THE INVENTION

In accordance with the invention, the objective is achieved by having two sets of plates where all the plates of one set are firmly connected in the direction of rotation around the axis of rotation to one of the two coupling parts. The plates of the other set form at least one group of which, in each case, at least two plates are connected to one another over a predetermined delimited rotational path. The two plates are connected in a drive-free way, by driving elements in the form of lugs. Outside the region of overlap between the plates, the driving elements project from at least one of the two planar faces to extend parallel to the axis of rotation and at the end of the respective drive-free rotational path, contact one another for rotational driving purposes.

The advantage of this design is that the plates successively take part in the shearing action, i.e. for a certain range of the rotational angle, they permit freewheeling and do not generate a reaction moment which would lead to the transmission of torque. The required torque build-up can be achieved by arranging the plates with the lugs one behind the other, either individually or in groups. Further, the torque build-up can be varied by means of the freewheeling range. In cases where the outer plates constitute the non-rotating plates and the inner plates constitute plates which are arranged one behind the other with rotational play existing therebetween, the driving elements are displaced into a radially inner position in the direction of the hub. In cases where the inner plates are fixed, the driving elements are arranged in a radially outer position. However, an advantageous embodiment is obtained if the outer plates constitute the fixed plates and if only one of the inner plates is non-rotatably connected to the hub, with the other inner plates following successively with rotational play existing therebetween. In this embodiment, the driving elements are arranged on a smaller rotational circle. Thus, a compact design is achieved because the operating plate faces participating in the shear of the viscous medium are arranged on a larger diameter and are therefore more effective than in the case of a smaller distance from the axis of rotation. Therefore, it is possible to achieve a more compact design. The lugs are perfectly capable of accommodating the torque although there is only a small lever arm relative to the axis of rotation.

According to a first embodiment, it is proposed that the outer plates form the set of plates which are non-rotatably connected to one of the two coupling parts, i.e. the housing and the inner plates form the set of plates of which at least two are connected by lugs so as to be relatively adjustable to a limited extent.

According to a second embodiment, it is proposed that the inner plates form the set of plates which are non-rotatably connected to one of the two coupling parts, i.e. the hub and the outer plates form the set of plates of which at least two are connected by lugs to be relatively adjustable to a limited extent.

According to a further embodiment of the invention it is proposed that sets of teeth with teeth extending parallel to the axis of rotation are provided to firmly connect the inner plate to the hub or the outer plate to the housing.

In a further embodiment, the plates of the set permitting a drive-free rotational path comprise plates having lugs which project from one of the two planar faces, as well as plates having lugs projecting from the two planar faces of same.

BRIEF DESCRIPTION OF THE DRAWINGS

Two preferred embodiments of the viscous coupling in accordance with the invention are diagrammatically illustrated in the drawing wherein FIG. 1 is a longitudinal section of a first embodiment of the viscous coupling wherein the outer plates are non-rotatably associated with the housing, and the inner plates are arranged one behind the other with rotational play therebetween;

FIG. 2 is a view of an inner plate with driving elements to be used in a viscous coupling according to FIG. 1;

FIG. 3 is a cross-sectional view taken along line III—III of FIG. 2 through an inner plate with driving elements;

DETAILED DESCRIPTION OF A PREFERRED EMBODIMENT

Figure 4:
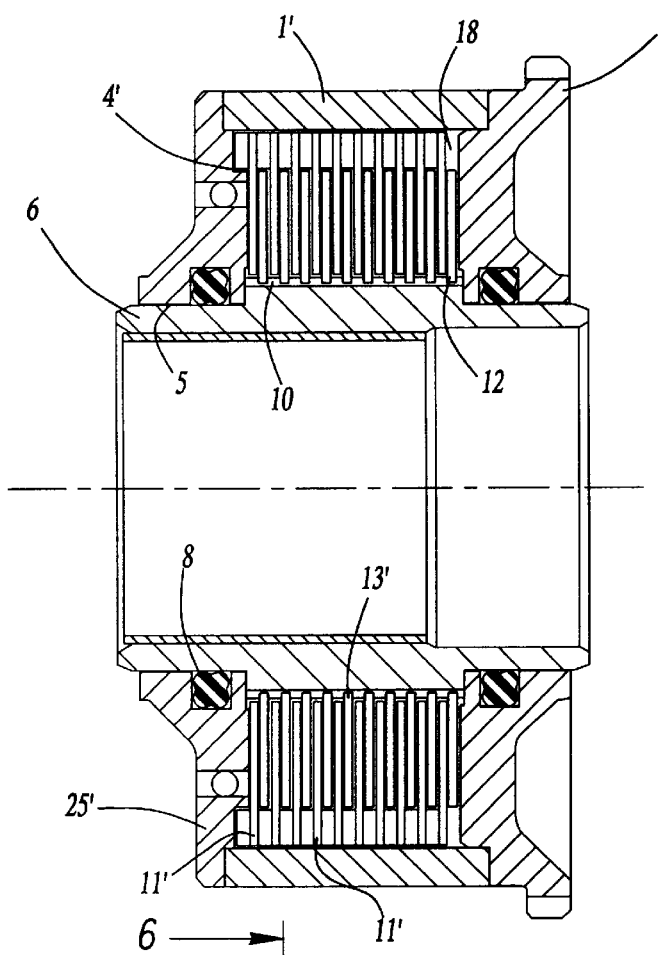
FIG. 4 is a longitudinal section through a viscous coupling wherein the inner plates constitute the fixed plates, and the outer plates are arranged one behind the other, with freewheeling conditions being provided.

A viscous coupling embodiment as shown in FIGS. 1 to 3, includes a housing 1 with a flange 2 and a dish 3 firmly connected to one another. The dish 3 comprises teeth 4 that extend parallel to an axis of rotation 7 and are arranged circumferentially spaced around the inner circumference of the dish 3. Further, the end wall 25 of the dish includes a bore 5 through which a shaft part of the hub 6 is guided outwardly. A part of hub 6 accommodated in an inner chamber 18 defined by the housing 1, has the hub is provided with axially facing outer teeth 10 that project parallel to the rotational axis 7. In the inner chamber 18, there are arranged outer plates 11 and inner plates 13 to alternate in sequence along the axis of rotation 7. The outer circumference of the outer plates 11 has teeth designed to match the teeth 4 of the housing 1. The outer plates 11 are arranged at a distance from one another. For this purpose there are provided spacing means which are not referred to in greater detail.

In the embodiment illustrated, one of the inner plates 13 is arranged between two outer plates 11. The outer plates 11 are annular in shape. They comprise a bore 12, so that the inner plates 13 and the outer plates 11 overlap only partially in the radial direction. An endmost one 11 of the outer plates has a larger bore to clear the hub 6. The plates 13 that are nearest the hub 6 has driving engagement therewith by means of lugs or teeth 10 as described hereafter engaging teeth 10 of the hub 6. Thus, they non-rotatably connect the first inner plate 13 to the hub 6. The successive inner plates are drivingly connected by lugs as described below, radially inside of the bore 12 of the outer plates 11. The inner chamber 18 of the viscous coupling which is not occupied by the outer plates 11 and inner plates 13 is filled with a highly viscous medium, preferably silicone oil. The silicone oil preferably has a viscosity of 5,000–300,000 Cst.

FIGS. 2 and 3 show an inner plate 13. The inner plate 13 has circumferentially distributed slots 15 which start from the outer circumference 14 of the inner plate and extend radially towards the axis of rotation 7.

The slots 15 increase the shear rate of the silicone oil, so that a certain torque behavior is achieved when a relative rotation occurs between the housing 1 and the hub 6 around the axis of rotation 7. The inner plate 13 comprises two circumferentially distributed lugs 16 which constitute driving elements and which are arranged approximately diametrically opposite one another with reference to the axis of rotation 7. That is, the lugs are radially offset from the axis of rotation 7 such that they are positioned inside the bore 12 of the outer plates 11. The lugs 16 are punched out of the material of the inner plates 13 and bent. The lugs 16 project axially from the planar face 20 towards the left in the figure. A second set of lugs 17 project from the opposite planar face 21 and are arranged on the same rotational circle relative to the axis of rotation 7 as the lugs 16. Again, there are two lugs 17. However, they are arranged so as to be circumferentially offset relative to the lugs 16, in the direction of rotation around the axis of rotation 7. Starting from the inner plate 13, which is non-rotatably connected to the hub 6 according to FIG. 1, the inner plates respectively arranged on the axis of rotation one behind the other, i.e. towards the right, are coupled to one another by the lugs 16, 17. For example, the lugs 17 of each inner plate lie in the space between two lugs 16 of the following inner plate. In turn, the lugs 17 projecting from the planar face 21 of the following plate are positioned within the range of movement of the lugs 16 of the next following inner plate 13. This results in a rotational play in the direction of rotation with an angle 19 shown in FIG. 2. After having been passed through, this leads to a non-rotating connection, for example between the successive inner plate 13. This means that in the case of a relative rotation between the hub 6 and the housing 1, the operation of the successive inner plates 13 is delayed, i.e. they participate in the shearing action with a delay in terms of time, so that the increase in torque is stepped. As the inner plates 13 are connected to one another by means of the lugs 16, 17 only, the inner plates are additionally guided along their outer circumference 14 at the heads of the teeth 4 of the housing 1. Thus, it is ensured that eccentricities cannot occur.

If such a viscous coupling is used as a brake in a firebreak door for example, there first exists a lower resistance against the door being closed so that the closing movement can be accelerated. This is particularly important in the case of roll-up doors since the weight causing the movement is small at first and only increases as the door continues to unroll. To the same extent, there is a stepped delay in the movement of the roll-up door into the closed position, due to the successive arrangement of the inner plates. They come into operation one after the other with a delay in terms of time. It is also possible to provide an embodiment wherein several groups of outer and inner plates are selected so that there are provided several inner plates 13 firmly connected to the hub 6 and followed by only a few inner plates 13 connected to the hub 6 via a rotational play, i.e. there are provided several groups of such assemblies in the housing 1.

Figure 5:
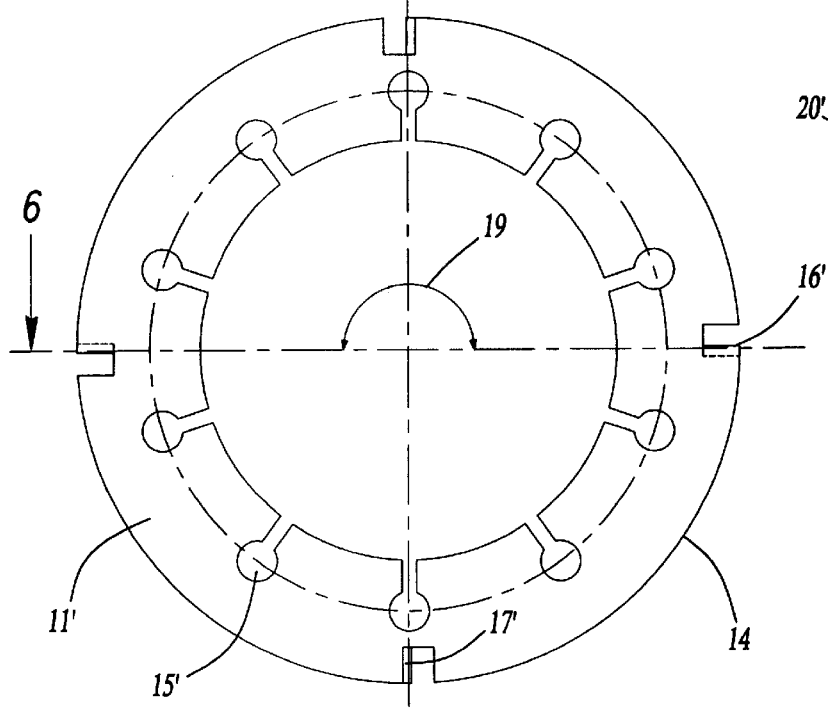
FIG. 5 is a view of the planar face of an outer plate with driving elements to be used in a viscous coupling according to FIG. 4.
Figure 6:
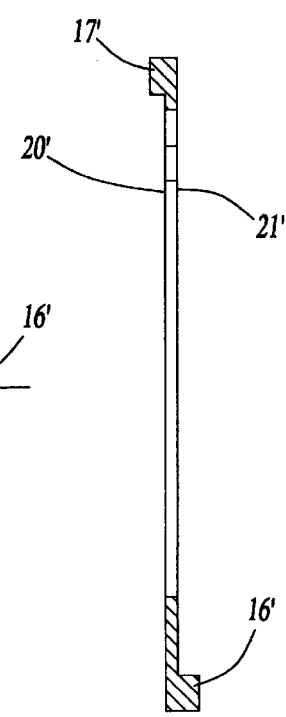
FIG. 6 is a cross-sectional view taken along line VI—VI of FIG. 5.

In the embodiments of FIGS. 4–6, parts corresponding to those above described are defined by corresponding reference numerals in some cases with the addition of a prime (' or ").

FIG. 4 shows an embodiment wherein the housing 1 does not have teeth. However, the hub 6 passes through the housing 1 completely and, on its outer face, has continuous teeth 10 in which all inner plates 13' are non-rotatably received. The inner plates 13' are spaced. Between each two inner plates 13' there is arranged an outer plate 11'. The coupling housing 1, in the region of the end wall 25 of the dish 3, on its inner face, comprises short teeth 4' in which a first outer plate 11' is non-rotatably received by means of corresponding outer teeth or a pair of lugs 17'. The further outer plates 11' are connected to the first outer plate 11' arranged close to the base only by means of driving elements in the form of lugs 16', 17' arranged at the outer circumference of the outer plates 11'. Consequently, the outer circumference of the inner plates has a smaller diameter. Otherwise, both the inner plates 13' and the outer plates 11' are annular in shape. The lugs 16', 17' axially overlap the inner plates 13'.

FIGS. 5 and 6 illustrate an embodiment of an outer plate 11' with two planar faces 20', 21' having projecting lugs 16', 17'. In the case of the first outer plate 11' following the end wall 25 of the dish 3, only the lugs 16' project in the direction of the axis of rotation 7 towards the flange 2 and the following outer plate, and they are positioned in the range of movement of the lugs 17' of same. As the lugs 17' are circumferentially offset relative to the lugs 16', there exists a corresponding clearance which has the same effects as explained in connection with the embodiment according to FIGS. 1 to 3. The plate has keyhole shaped slots 15' extending from its inner periphery.

The preferred embodiments have been disclosed, however, a worker of ordinary skill in the art would recognize that modifications would come with the scope of this invention. Thus, the following claims should be studied.

I claim:

1. A viscous coupling, for use as a brake, comprising:

a housing and a hub arranged coaxially around, and rotatably relative to one another and arranged to enclose an inner chamber between them;

two sets of plates which partially radially overlap one another, one set of plates comprising outer plates and the other set comprising inner plates;

all of said plates of one of said two sets being firmly connected in the direction of rotation around an axis of rotation to one of said housing and said hub; and said plates of said other set forming at least one group of which, in each case, at least two plates are connected to one another over a predetermined delimited rotational path, in a drive-free way, by driving elements in the form of lugs which, outside the region of overlap between said plates, project from at least one of two planar faces to extend parallel to said axis of rotation and which, at the end of the respective drive-free rotational path, contact one another for rotational driving purposes.

2. A viscous coupling according to claim 1, characterized in that said outer plates form said one set of plates and said inner plates form said other set of plates.

3. A viscous coupling according to claim 1, characterized in that said inner plates form said one set of plates and said outer plates form said other set of plates.

4. A viscous coupling according to claim 1, characterized in that teeth extend parallel to said axis of rotation for firmly connecting said inner plates to said hub.

5. A viscous coupling according to claim 1, characterized in that teeth extend parallel to said axis of rotation for firmly connecting said outer plates to said housing.

6. A viscous coupling according to claim 1, characterized in that said plates of said set permitting drive-free rotational path comprise plates having a first set of lugs which project from one of two planar faces as well as plates having said first and a second set of lugs which project from said two planar faces of same.

* * * * *